(12) United States Patent
Lee

(10) Patent No.: US 10,500,500 B2
(45) Date of Patent: Dec. 10, 2019

(54) MASSIVELY SINGLE-PLAYING ONLINE GAME

(71) Applicant: NINTENDO CO., LTD., Kyoto (JP)

(72) Inventor: Yoonjoon Lee, Redmond, WA (US)

(73) Assignee: NINTENDO CO., LTD., Kyoto (JP)

( * ) Notice: Subject to any disclaimer, the term of this patent is extended or adjusted under 35 U.S.C. 154(b) by 48 days.

(21) Appl. No.: 15/412,149

(22) Filed: Jan. 23, 2017

(65) Prior Publication Data

US 2017/0128835 A1 May 11, 2017

Related U.S. Application Data

(63) Continuation of application No. 12/698,422, filed on Feb. 2, 2010, now Pat. No. 9,566,503.

(51) Int. Cl.
| | |
|---|---|
| *A63F 13/24* | (2014.01) |
| *A63F 13/67* | (2014.01) |
| *A63F 9/24* | (2006.01) |
| *A63F 13/31* | (2014.01) |
| *A63F 13/35* | (2014.01) |
| *A63F 13/49* | (2014.01) |

(52) U.S. Cl.
CPC ............... *A63F 13/67* (2014.09); *A63F 9/24* (2013.01); *A63F 13/31* (2014.09); *A63F 13/35* (2014.09); *A63F 13/49* (2014.09)

(58) Field of Classification Search
CPC ........ A63F 13/822; A63F 13/00; A63F 13/44; A63F 2300/50; A63F 2300/63; A63F 2300/65; A63F 2300/807
See application file for complete search history.

(56) References Cited

U.S. PATENT DOCUMENTS

| | | | |
|---|---|---|---|
| 6,179,713 B1 | 1/2001 | James et al. | |
| 6,227,974 B1 * | 5/2001 | Eilat | A63F 13/005 463/40 |
| 6,273,818 B1 | 8/2001 | Komoto | |
| 6,672,961 B1 | 1/2004 | Uzun | |
| 6,884,172 B1 | 8/2005 | Lloyd et al. | |
| 7,437,409 B2 | 10/2008 | Danieli | |
| 7,637,806 B2 | 12/2009 | Rhyne, IV et al. | |
| 7,785,199 B2 | 8/2010 | Nishimura et al. | |
| 7,828,660 B2 | 11/2010 | Kando et al. | |
| 7,833,096 B2 | 11/2010 | Sakaguchi et al. | |
| 7,946,909 B2 | 5/2011 | Neveu et al. | |
| 2002/0142843 A1 | 10/2002 | Roelofs | |
| 2003/0177187 A1 * | 9/2003 | Levine | A63F 13/10 709/205 |
| 2004/0070564 A1 | 4/2004 | Dawson et al. | |

(Continued)

OTHER PUBLICATIONS

"How World of WarCraft Works", Jan. 18, 2009, pp. 1-9, <http://web.archive.org/web/20090118063109>, <http://electronics.howstuffworks.com/world-of-warcraft.htm/printable>.

(Continued)

*Primary Examiner* — Omkar A Deodhar
*Assistant Examiner* — Shauna-Kay Hall
(74) *Attorney, Agent, or Firm* — Nixon & Vanderhye P.C.

(57) ABSTRACT

A method and apparatus that allows a player to play a massively single-player online game without directly interacting with other players, while affecting and being affected by other players playing the online game.

16 Claims, 3 Drawing Sheets

(56) References Cited

U.S. PATENT DOCUMENTS

| | | | |
|---|---|---|---|
| 2004/0143852 A1* | 7/2004 | Meyers | A63F 13/12 725/133 |
| 2005/0197948 A1 | 9/2005 | Davie et al. | |
| 2006/0135263 A1 | 6/2006 | Labrie | |
| 2006/0154710 A1* | 7/2006 | Serafat | A63F 13/10 463/1 |
| 2006/0258453 A1 | 11/2006 | Kando | |
| 2007/0060359 A1 | 3/2007 | Smith | |
| 2007/0076015 A1 | 4/2007 | Tanabe et al. | |
| 2007/0111794 A1 | 5/2007 | Hogan et al. | |
| 2007/0129126 A1 | 6/2007 | Van Luchene | |
| 2007/0129148 A1* | 6/2007 | Van Luchene | G06Q 30/04 463/42 |
| 2007/0167204 A1* | 7/2007 | Lyle | A63F 13/12 463/9 |
| 2008/0026838 A1 | 1/2008 | Dunstan et al. | |
| 2008/0280684 A1 | 11/2008 | McBride et al. | |
| 2009/0098940 A1* | 4/2009 | Sangberg | H04L 67/38 463/42 |
| 2009/0149248 A1* | 6/2009 | Busey | A63F 13/12 463/29 |
| 2009/0181777 A1* | 7/2009 | Christiani | G07F 17/32 463/42 |
| 2009/0253513 A1 | 10/2009 | Ducheneaut et al. | |
| 2009/0254859 A1 | 10/2009 | Arrasvuori et al. | |
| 2010/0093439 A1 | 4/2010 | Brady | |
| 2010/0121729 A1* | 5/2010 | Betzler | A63F 13/12 705/26.1 |
| 2010/0285858 A1* | 11/2010 | Clowes | G07F 17/3272 463/9 |
| 2011/0118033 A1* | 5/2011 | Fiedler | A63F 13/85 463/42 |

OTHER PUBLICATIONS

World of Warcraft—Game Manual PC, released Nov. 24, 2004, pp. 1-114, <http://www.replacementdocs.com>.

Demon's Souls, Sony Corporation, Feb. 5, 2009, pp. 1-3, <http://en.wikipedia.org/wiki/Demon%27s Souls#cite_note-13>.

Innovative/Interesting Online Components (Demon's Souls Case Study), published Apr. 20, 2009, pp. 1-4, <http://www.neogaf.com/forum/showthread.php?t=359070>.

Animal Crossing Review, released Sep. 2002, <http://cube.ign.com/articles/370/370203p1.html> Animal Crossing, released Dec. 5, 2005, <http://ds.ign.com/articles/673/673671p1.html>, pp. 1-9.

Game Concepts—Demon's Souls English wiki, pp. 1-4, <http://demonssouls.wikidot.com/concepts#toc21>.

"Little Big Planet", <http://en.wikipedia.org/wiki/LittleBig Planet>, pp. 1-11.

* cited by examiner

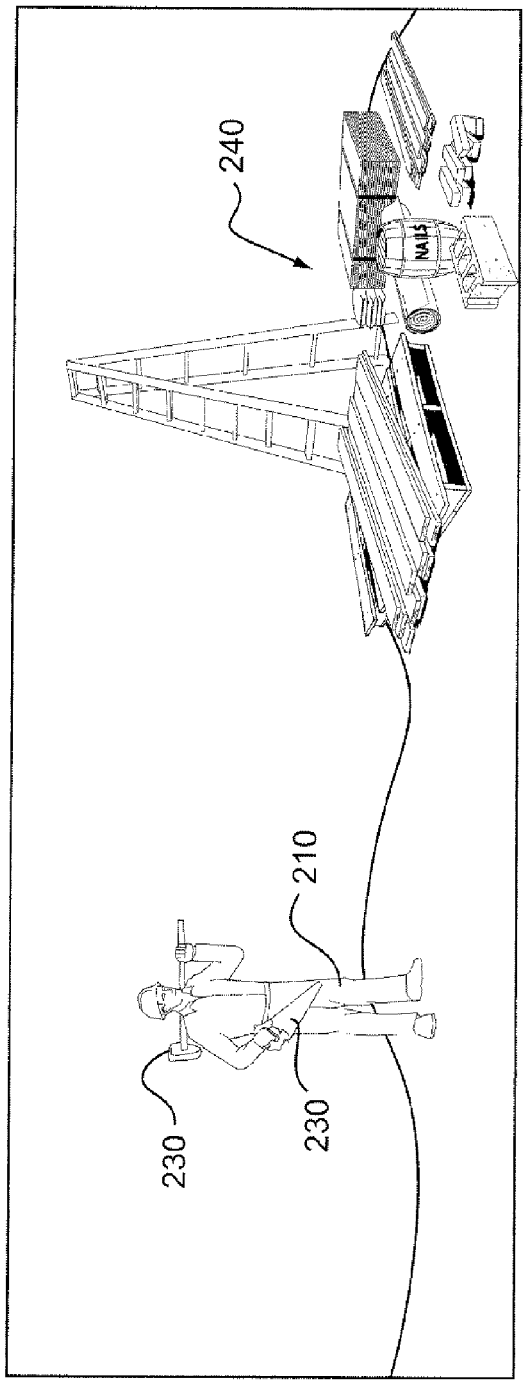
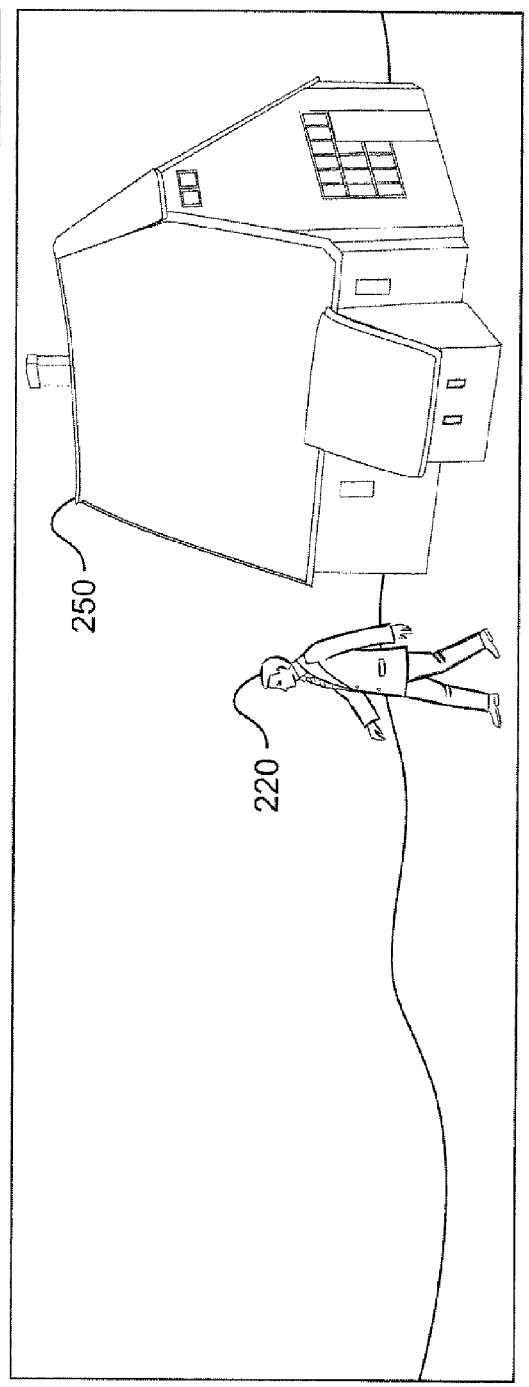

MASSIVELY SINGLE-PLAYING ONLINE GAME

This application is a continuation of U.S. patent application Ser. No. 12/698,422, filed Feb. 2, 2010, the contents of which are incorporated herein by reference.

TECHNICAL FIELD

The technology herein relates to a method and apparatus for playing a single-player online game wherein the actions of one player can affect the status of the same game being played by other players. In more detail, the technology herein relates to techniques for allowing a player to play a single-player game online without directly interacting with other players playing the same game, while shaping how the game is going to be played by the other players.

BACKGROUND AND SUMMARY

A popular genre of computer games is the role-playing game (RPG) where the human player assumes control of a character or "avatar" in the game. The mass proliferation of such RPGs can be traced to Second Life, a multiplayer online virtual world, where players fashion their own online personae and interact with other players' avatars. The human player can for example move his or her avatar through the virtual environment the game defines and interact with virtual objects in the game space, other avatars controlled by other human players and/or game characters the computer controls.

There is a social dimension to Second Life. Because each human player controls his or her own avatar, interacting with another person's avatar is actually a way to interact with that other person. People can work together through their avatars to create objects in the virtual world. For example, several people can have their avatars team up and work together to go boating, or build or decorate a house. Such high degree of interactivity has allowed human participants to forge friendships and even romances.

Second Life is an example of a role playing game where what happens is almost completely defined by the virtual environment's human participants. Other types of role playing games have a more structured plot. For example, World of Warcraft, another popular massively multiplayer online game, can be considered a form of interactive storytelling as can other "MUDs" (multi-user-dungeon) games. The game developer provides a world and a set of characters for the players to interact with, and he/she determines how the interaction proceeds. For example, the game assigns avatars quests to accomplish. The player's avatars play the heroes, while the game software directs or referees many of the outcomes.

One common characteristic of many or most RPGs is that the multiple players' avatars share a common game space and can play at the same time. Various players throughout the world connect to a network, log to the game server, and play the game simultaneously. The actions of an avatar controlled by a player can affect the actions of other avatars controlled by other players as well as the status of the game. Such multi-avatar interaction occurs when multiple players play together at the same time, i.e., the game being played is a multiplayer game.

A high degree of interactivity in real time in RPGs is attractive to many players. However, some players may not want social interaction while nevertheless enjoying the benefit of a very dynamic virtual world. For example, it would be beneficial to provide a method and a system that allows a single player to play a game without the player having to interact with other players playing the game at the same time. However, it would be desirable if the player's avatar's actions still affect the status of the game and the status of other avatars, like in the conventional multiplayer games, even though the game being played is a single-player game from the perspective of each participant of the game.

In one exemplary illustrative non-limiting implementation, a single-player game is played where the player controls an avatar in a game space. The actions of the avatar affect the status of other avatars controlled by other human players and/or game characters or virtual game environment controlled by the computer, even though the player's avatar does not interact with avatars of other human players participating in the game at the same time.

In another exemplary illustrative non-limiting implementation, any massively single-playing online game (MSO) may be shared by a great plurality of players who are able to play a favorite game without the simultaneous interaction with other players playing the game at the same time, while having the capability of affecting the status of the game and of the non-player avatars of other players exactly as if they were playing a multiplayer game.

Non-limiting exemplary illustrative features and advantages for exemplary implementations include:
  This is a game idea that lets players play a single player game with the benefits of playing with other people without having to physically interact with other people.
  Players are fully affected by everything that happens in the game world in the same server that they share.
  Each individual player's decision collectively shapes how the game is going to be played.
  There is currency that fluctuates depending on the market condition that affects all the cost of living, for example.
  If a certain item in the game gets popular, the value of it goes up and all the related events in the game will trigger as another example.
  The server polls each game to collect key data each session, and updates its database in real-time to trigger events and set global variables.
  Those who want to play games that are more dynamic, not-based on AI and not-pre-scripted like multiplayer games, however, don't want to "deal" with other people, appreciate the privacy it provides.
  Online game play with others without actually interacting with others physically.

BRIEF DESCRIPTION OF THE DRAWINGS

These and other features and advantages will be better and more completely understood by referring to the following detailed description of exemplary non-limiting illustrative embodiments in conjunction with the drawings of which:

FIGS. 2A and 2B schematically show game scenes of a non-limiting exemplary embodiment of the online game according to the invention.

DETAILED DESCRIPTION

Figure 1:
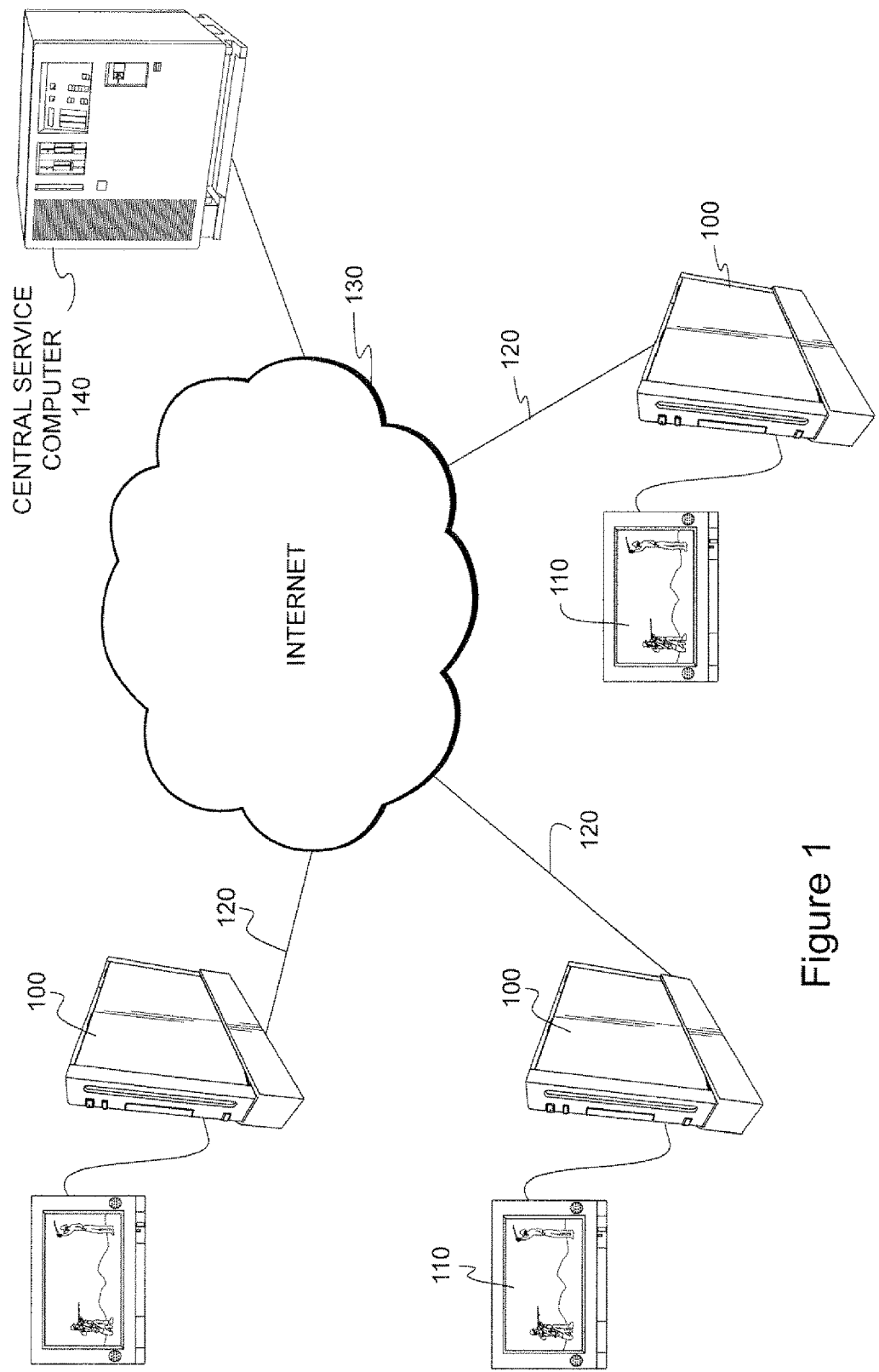
FIG. 1 schematically shows a web-based network supporting a non-limiting exemplary embodiment of the online game according to the invention.

Techniques described herein can be performed on any type of computer system including a personal computer, a home video game machine, a portable video game machine, a networked server and display, a cellular telephone, a personal digital assistant, or any other type of device or arrangement having computation and graphical display capabilities. One exemplary illustrative non-limiting implementation includes a home video game system such as the Nintendo Wii 3D video game system, a Nintendo DS or other 3D capable interactive computer graphics display systems. One exemplary illustrative non-limiting implementation is described below, but other implementations are possible.

In an exemplary embodiment, a player using video game machine 100 is connected to the internet or other network 130 and plays games online. The player game consoles 100 can communicate with the central service computer 140 through the internet network in a known manner. A server 140 hosts a game environment the player's avatar can operate within.

As shown in FIG. 1, a plurality of video game consoles 100, each connected to TV monitors 110 are connected to the internet 130 through an internet server provider (ISP) 120 or by other means. Each of the players operating the game consoles 100 has access to a central service computer 140. Access to computer 140 results in the establishment of user identification information available to the central service computer 140 such as creation of identification records (assuming the user has given permission to disclose confidential information).

The user game console 100 can be coupled to the central service computer in ways other than through the internet. For example, telephone wire connection may be used through modulator/demodulators (modem) or any other data communications means can be used.

Each player using a game machine 100 can log into the network 130 and be connected to the central service computer 140 so that he/she can start playing a single player game. Once started, each player sees the same game scene 150 on his/her monitor 110. The central service computer can offer the same game features, capabilities and general game background to each of the plurality of players who have access to it through the network 130.

FIG. 2A shows a typical game scene that a first human player sees when he/she plays a single player game on his/her game console 100. The scene includes a game character 210 which is controlled by the first player. The central service computer has data comprising game related information such as game characters associated to various players stored in its data base. When a player accesses the central service computer to start playing a game, all the game related data stored in the central service computer becomes available to the player.

Turning back to FIG. 2A, the game character 210 carries tools 230. The game character 210, controlled by the first player, can build a structure such as a house. The game character 210 sees building materials 240 and decides to build a house. Hence, as can be seen in FIG. 2B, the first player builds a house 250. As a result of the actions of the game character 210, the house is constructed and becomes part of the environment. After game character 210 successfully accomplishes his/her goal, then he/she moves on to other parts of the game world available to game character 210.

According to the exemplary embodiment, the house constructed by player 210 becomes part of the virtual environment available to any other player who wishes to play the game. Therefore, when the second player who controls a game character 220 plays the same game that was played by the first player, he/she encounters his/her game character 220 in the state shown in FIG. 2B, that is the house constructed by game character 210 is available to player 220. From this point on, the second player can continue playing the game, controlling his/her character 220 and affecting virtual objects and other game characters in the game world.

As another example, player character 210 can gossip to a non-player character who can then report the story to a player character 220 without player characters 210, 220 ever seeing or interacting with one another—even though they may be in the same room at the same time.

In another exemplary embodiment, the actions of a player playing in a single-player game may trigger events that affect the playing of other players playing the same single-player game at the same or a later time.

For example, a certain item in the game, for example, a purse in a store that sells high fashion items may get very popular, as many players playing their single-player online games decide to buy that item. This event then may trigger the price of the item to increase or the item becoming unavailable for players who play their games subsequently. Or, in a simulation of a world market online game, the price of a certain commodity, such as oil, may fluctuate depending on various actions of players playing their single-player online games, for example, a country controlled by a player invading another oil-rich country. The effect of these actions then are felt by other players who play the same game later, as they experience market conditions that reflect the increased price of oil, e.g., higher cost of living, higher inflation, etc.

In another embodiment, a player can interact only with other player avatars the player has "friended" or otherwise authorized interaction with. In this implementation, even though the player is affected indirectly (through the environment including non-player characters) by all other player avatars in a massively multiplayer environment, the player avatar only needs to interact with avatars of those other players he or she knows beforehand, thus preserving privacy and protecting the player from unknown or undesired interactions.

Figure 3:
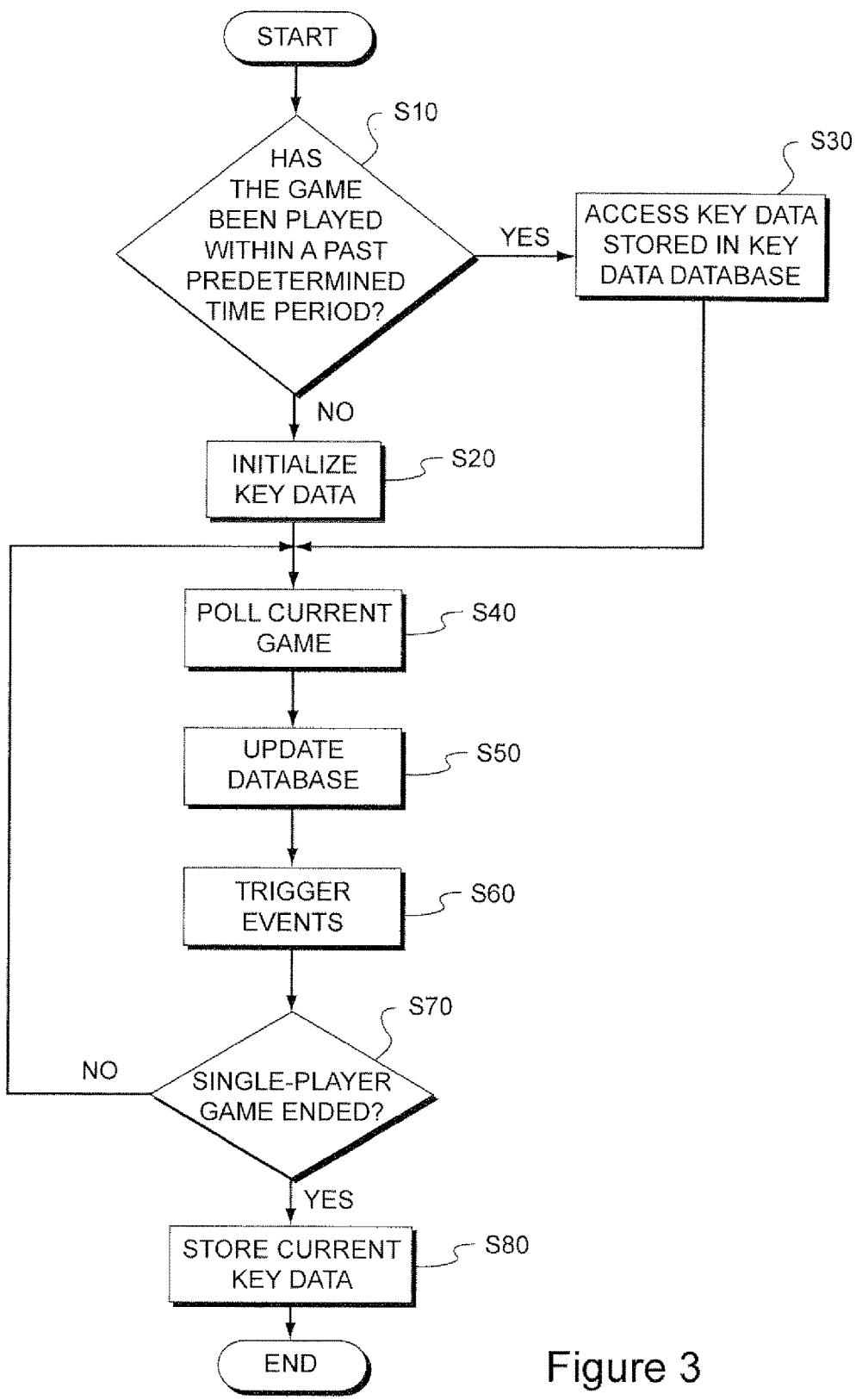
FIG. 3 shows an exemplary illustrative non-limiting software flowchart.

FIG. 3 shows a flowchart of an exemplary illustrative non-limiting process performed by the central server 140 to dynamically operate a single-player online game so that the actions of one player playing the game can affect the status of the game being played by other players at the same time or a later time.

After a single-player game starts, the central server 140 determines whether the particular game has been played within a predetermined time period (step S10). If the answer is negative, then the central server 140 initializes all key data in its database in step S20. Key data my include, for example, the lifetime of each game character that has been created in the particular game, the strength of each game character, the financial status of each game character, etc. However, if the answer is affirmative, then the central server accesses key data that is stored in its key data database (step S30) and moves to step S40 (described later). After initialization, or after step S30, the server 140 polls the game at the current time in step S40. In this step, the server 140 records the current value of the various predetermined key data parameters, a value that is directly affected by the actions of the player that plays the single-player game. Subsequently, in step S50, the server 140 updates the key data database based on the polled values. This polling and updating process occurs at predetermined regular time intervals, for example, a few msec, so that the central server 140 takes a reasonably representative sampling of the dynamic evolution of the single-player game. Following step S50, the central server triggers various events in the game space depending on the values of the key data being updated, including setting global variables (step S60). Next, it is determined if the single player game has ended (step S70). If the game continues, then the process goes back to step S40 to perform more polling of the game key parameters. On the other hand, if it is determined that the game has reached its end, then the central server stores the current key data in the key data database (step S80) and the programs ends.

The above disclosed technique and system allows a player to play games that are more dynamic and are not pre-scripted like conventional single-player games. Moreover, the player does not need to directly interact with other people and is provided with a measure of appreciated privacy. Hence, the disclosed online game offers play involving other players without actually requiring interacting with others in real time.

While the technology herein has been described in connection with exemplary illustrative non-limiting implementations, the invention is not to be limited by the disclosure. The invention is intended to be defined by the claims and to cover all corresponding and equivalent arrangements whether or not specifically disclosed herein.

The invention claimed is:

1. A game server system for providing a virtual game environment for a video game, the game server comprising:
   a network interface configured to establish connections between remote player devices and the game server;
   a storage device configured to store game data for the video game, the stored game data usable by respective single-player game sessions of the video game that are performed with each of the remote player devices; and
   at least one hardware processor that is configured to:
      provide, to a first remote player device, a first single-player game session for the video game that is presented to a first user, wherein the presented video game is configured to accept input from the first user to interact with the virtual game environment, the interaction including at least addition of a first virtual object to the virtual game environment,
      based on addition of the first virtual object within the virtual game environment during the first single-player game session, update the stored game data for the video game to reflect the addition of the first virtual object within the virtual game environment,
      provide, as part of a second single-player game session and based on the stored game data, data for the virtual game environment to a second remote player device that is used by a second user, wherein presentation of the virtual game environment within the video game running on the second remote player device is based on interactions of the first user with the virtual game environment, including addition of the first virtual object to the to the virtual game environment, and
      based on second user interactions, which are provided during the second single-player game session, that affect the first virtual object within the virtual game environment, update the stored game data for the video game to reflect how the first virtual object has been affected by the second user interactions, wherein at least one subsequent single-player game session is provided based on the how the first virtual object has been affected by the second user interactions,
   wherein first and second users are not allowed to directly interact through the virtual game environment of the video game.

2. The game server system of claim 1, wherein the first single-player game session and the second single-player game session occur at the same time.

3. The game server system of claim 1, wherein the first single-player game session and the second single-player game session occur at different times from each other.

4. The game server system of claim 1, wherein the at least one hardware processor is further configured to:
   update game conditions of the virtual game environment based on first user interactions performed during the first single-player game session or second user interactions performed during the second single-player game session.

5. A networked multiplayer game playing system comprising:
   the game server system of claim 1;
   the first remote player device; and
   the second remote player device,
   wherein each of the first remote player device and second remote player device includes hardware processing resources configured to execute the video game, communicate with the game server system, and receive input from respective first and second users.

6. The game server system of claim 1, wherein first user interactions and second user interactions with the virtual game environment including controlling at least one virtual game character that is within the virtual game environment.

7. A method for playing a networked multiplayer video game, comprising:
   providing a virtual game environment using at least one server;
   establishing connections between remote player devices and the server;
   at a storage device, saving game data for the video game, the stored game data usable by respective game sessions of the video game that are performed with each of the remote player devices; and
   at a processor of at least one of the servers:
      providing, to a first remote player device, a first game session for the video game that is presented to a first user, wherein the presented video game is configured to accept input from the first user to interact with the virtual game environment, the interaction including at least addition of a first virtual object to the virtual game environment,
      based on addition of the first virtual object within the virtual game environment during the first game session, updating the stored game data for the video game to reflect the addition of the first virtual object within the virtual game environment,
      providing, as part of a second game session and based on the stored game data, data for the virtual game environment to a second remote player device that is used by a second user, wherein presentation of the virtual game environment within the video game running on the second remote player device is based on interactions of the first user with the virtual game environment, including addition of the first virtual object to the to the virtual game environment, and
      based on second user interactions, which are provided during the second game session, that affect the first virtual object within the virtual game environment, updating the stored game data for the video game to reflect how the first virtual object has been affected by the second user interactions, wherein at least one subsequent game session is provided based on the how the first virtual object has been affected by the second user interactions, wherein first and second users are not allowed to directly interact through the virtual game environment of the video game.

8. A non-transitory computer readable storage medium storing instructions for use with a video game server that includes at least one hardware processor, the stored instructions comprising instructions that cause the at least one hardware processor to:

maintain a virtual game environment of a video game;

establish connections between remote player devices and the video game server;

store, to a storage device coupled to the video game server, game data for the video game, the stored game data usable by respective game sessions of the video game that are performed with each of the remote player devices;

provide, to a first remote player device, a first game session for the video game that is presented to a first user, wherein the presented video game is configured to accept input from the first user to interact with the virtual game environment, the interaction including at least addition of a first virtual object to the virtual game environment;

based on addition of the first virtual object within the virtual game environment during the first game session, update the stored game data for the video game to reflect the addition of the first virtual object within the virtual game environment;

provide, as part of a second game session and based on the stored game data, data for the virtual game environment to a second remote player device that is used by a second user, wherein presentation of the virtual game environment within the video game running on the second remote player device is based on interactions of the first user with the virtual game environment, including addition of the first virtual object to the to the virtual game environment; and based on second user interactions, which are provided during the second game session, that affect the first virtual object within the virtual game environment, update the stored game data for the video game to reflect how the first virtual object has been affected by the second user interactions, wherein at least one subsequent game session is provided based on the how the first virtual object has been affected by the second user interactions, wherein first and second users are not allowed to directly interact through the virtual game environment of the video game.

9. The method of claim 7, wherein the first game session and the second game session occur at the same time.

10. The method of claim 7, wherein the first game session and the second game session occur at different times from each other.

11. The method of claim 7, further comprising:

updating game conditions of the virtual game environment based on first user interactions performed during the first game session or second user interactions performed during the second game session.

12. The method of claim 7, wherein first user interactions and second user interactions with the virtual game environment including controlling at least one virtual game character that is within the virtual game environment.

13. The non-transitory computer readable storage medium 8, wherein the first game session and the second game session occur at the same time.

14. The non-transitory computer readable storage medium 8, wherein the first game session and the second game session occur at different times from each other.

15. The non-transitory computer readable storage medium 8, wherein the stored instructions comprise further instructions configured to update game conditions of the virtual game environment based on first user interactions performed during the first game session or second user interactions performed during the second game session.

16. The non-transitory computer readable storage medium 8, wherein first user interactions and second user interactions with the virtual game environment including controlling at least one virtual game character that is within the virtual game environment.

* * * * *